United States Patent
Shirasuka et al.

(10) Patent No.: US 8,677,421 B2
(45) Date of Patent: Mar. 18, 2014

(54) DIGITAL BROADCAST RECEPTION APPARATUS

(75) Inventors: Keiichi Shirasuka, Tokyo (JP); Kazuya Takaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/256,987

(22) PCT Filed: May 11, 2010

(86) PCT No.: PCT/JP2010/057933
§ 371 (c)(1),
(2), (4) Date: Sep. 16, 2011

(87) PCT Pub. No.: WO2010/131637
PCT Pub. Date: Nov. 18, 2010

(65) Prior Publication Data
US 2012/0008719 A1   Jan. 12, 2012

(30) Foreign Application Priority Data
May 14, 2009   (JP) ................................. 2009-117420

(51) Int. Cl.
*H04N 7/16* (2011.01)
*H04B 7/02* (2006.01)
*H04B 1/02* (2006.01)
*H04N 5/50* (2006.01)

(52) U.S. Cl.
USPC ............. 725/62; 725/151; 348/732; 455/101; 375/347

(58) Field of Classification Search
USPC ............. 725/62, 151; 348/731, 732; 455/101; 375/347
See application file for complete search history.

(56) References Cited

U.S. PATENT DOCUMENTS

| | | | | |
|---|---|---|---|---|
| 5,461,427 A | * | 10/1995 | Duffield et al. | 348/555 |
| 6,181,921 B1 | * | 1/2001 | Konisi et al. | 455/186.2 |
| 6,359,580 B1 | * | 3/2002 | Morrison | 348/731 |
| 6,993,782 B1 | * | 1/2006 | Newberry et al. | 725/39 |
| 7,061,542 B1 | * | 6/2006 | Ikeguchi | 348/558 |

(Continued)

FOREIGN PATENT DOCUMENTS

| | | |
|---|---|---|
| CN | 101421942 (A) | 4/2009 |
| JP | 2004-320406 A | 11/2004 |

(Continued)

*Primary Examiner* — James R Sheleheda
(74) *Attorney, Agent, or Firm* — Birch, Stewart, Kolasch & Birch, LLP

(57) ABSTRACT

An object of the present invention is to provide a digital broadcast reception apparatus that allows a stable viewing even if a reception environment changes along with a movement. In the present invention, based on current position information indicating a current position detected by a current position detection section and broadcast area information stored in a broadcast area information storage section, a search-mode switching control section instructs a tuning control section to select a diversity operation mode if the current position is close to a boundary of a broadcast area, and select an independent reception operation mode if the current position is not close to the boundary of the broadcast area. In the diversity operation mode, a first system and a second system are tuned to the same physical channel, and cooperate with each other to demodulate a digital broadcast signal and a make an output through a diversity process. In the independent reception operation mode, the first system and the second system individually and independently demodulate the digital broadcast signal and make an output.

10 Claims, 6 Drawing Sheets

(56) References Cited

U.S. PATENT DOCUMENTS

| | | | |
|---|---|---|---|
| 8,108,749 B2* | 1/2012 | Cookman et al. | 714/752 |
| 2003/0152173 A1* | 8/2003 | Strolle et al. | 375/347 |
| 2003/0194031 A1* | 10/2003 | Strolle et al. | 375/347 |
| 2009/0180413 A1* | 7/2009 | Sutton | 370/311 |
| 2009/0187949 A1* | 7/2009 | Vare et al. | 725/54 |
| 2009/0238314 A1* | 9/2009 | Imagawa et al. | 375/345 |
| 2010/0171885 A1* | 7/2010 | Minagawa et al. | 348/731 |
| 2010/0265400 A1* | 10/2010 | Heider | 348/553 |
| 2011/0023070 A1* | 1/2011 | Vare et al. | 725/62 |

FOREIGN PATENT DOCUMENTS

| | | |
|---|---|---|
| JP | 2005-210648 A | 8/2005 |
| JP | 2006-270378 A | 10/2006 |
| JP | 2007-60491 A | 3/2007 |
| JP | 2007-251807 A | 9/2007 |
| JP | 2008-34962 A | 2/2008 |
| JP | 2008-136216 A | 6/2008 |
| JP | 2008-211340 A | 9/2008 |
| JP | 2008-259092 A | 10/2008 |
| JP | 2008-278058 A | 11/2008 |

* cited by examiner

F I G. 2

| TS NAME | PHYSICAL CHANNEL | BROADCAST AREA | | | | MFN PHYSICAL CHANNEL | AFFILIATE STATION CHANNEL |
|---|---|---|---|---|---|---|---|
| TS1 | 15ch | (x11, y11) | (x12, y12) | (x13, y13) | (x14, y14) | 17ch, 26ch | 30ch |
| TS2 | 27ch | (x21, y21) | (x22, y22) | (x23, y23) | (x24, y24) | 39ch | 14ch, 46ch |
| TS3 | 33ch | (x31, y31) | (x32, y32) | (x33, y33) | (x34, y34) | 22ch, 31ch, 55ch | 59ch |
| | | | | | | | |
| | | | | | | | |
| | | | | | | | |

41  42  43  44  45

F I G. 7

| TS (61) | PHYSICAL CHANNEL (62) | BROADCAST AREA (63) | | | | MFN TS (64) | AFFILIATE STATION TS (65) |
|---|---|---|---|---|---|---|---|
| TS1 | 15ch | (x11, y11) | (x12, y12) | (x13, y13) | (x14, y14) | TS17, TS26 | TS30 |
| TS2 | 27ch | (x21, y21) | (x22, y22) | (x23, y23) | (x24, y24) | TS39 | TS14, TS46 |
| TS3 | 33ch | (x31, y31) | (x32, y32) | (x33, y33) | (x34, y34) | TS22, TS31, TS55 | TS59 |
| | | | | | | | |
| | | | | | | | |
| | | | | | | | | ically

DIGITAL BROADCAST RECEPTION APPARATUS

TECHNICAL FIELD

The present invention relates to a digital broadcast reception apparatus, and more specifically a digital broadcast reception apparatus installed and used in a mobile object.

BACKGROUND ART

In a case where a digital broadcast reception apparatus premised on a stationary reception is installed and used in a mobile object such as a vehicle, the reception position of the digital broadcast reception apparatus moves in accordance with movement of the mobile object and therefore a digital broadcast signal may be sometimes not received because of occurrence of block, attenuation, and the like, of a carrier wave due to an influence of a landscape such as a mountain and a structure such as a building. Additionally, the reception position of the digital broadcast reception apparatus may be located out of a service area of a broadcast station that provides a currently viewed program so that the digital broadcast signal cannot be received.

In such a case, a problem arises that unless a user manually performs a channel scan, the digital broadcast signal cannot be received and the viewing in service cannot be continued. Here, the channel scan means acquiring channel information of a digital broadcast that can be received at the current position of the digital broadcast reception apparatus. The channel information is a general term for information of a physical channel, a service ID (service_id), and the like, that is necessary for tuning to a digital broadcast.

As a countermeasure against the above-mentioned problems, Patent Document 1 discloses a digital broadcast reception apparatus that, when a state in which the digital broadcast reception apparatus receives a digital broadcast signal deteriorates along with movement of a mobile object, starts a so-called search for searching another channel capable of reception in a system different from a system used for the viewing.

Additionally, in a digital broadcast reception apparatus disclosed in Patent Document 2, in a case where, as a result of performing a channel search in the different system for all channels, the same program as the currently viewed program cannot be detected in another channel or a reception state is not good even though it can be detected, the channel search in the different system is terminated and a diversity process is performed.

PRIOR-ART DOCUMENTS

Patent Documents

Patent Document 1: Japanese Patent Application Laid-Open No. 2005-210648 (pages 3-4; FIG. 2)
Patent Document 2: Japanese Patent Application Laid-Open No. 2008-034962 (pages 15-16; FIG. 3)

SUMMARY OF THE INVENTION

Problems to be Solved by the Invention

The digital broadcast reception apparatuses disclosed in the Patent Documents 1 and 2 are configured to start to search another channel in a different system in a case where the reception state is deteriorated. Searching another channel in the different system in spite of the deterioration in the reception state arises a problem that the reception state is further deteriorated because a diversity process cannot be performed on a system used for the current viewing.

Moreover, in the digital broadcast reception apparatuses disclosed in the Patent Documents 1 and 2, another channel is not searched until the reception state is deteriorated. Therefore, in a case of a rapid deterioration in the reception state, the reception may become impossible prior to a detection of another channel that broadcasts the same program, and an image and a sound may be stopped.

An object of the present invention is to provide a digital broadcast reception apparatus that allows a stable viewing even if a reception environment changes along with a movement.

Means for Solving the Problems

A digital broadcast reception apparatus according to the present invention includes: primary and secondary systems being tuned to a physical channel, receiving a digital broadcast signal of a broadcast service broadcasted from a broadcast station through the tuned physical channel, and demodulating and decoding the received digital broadcast signal; tuning control means for instructing the primary and secondary systems about a physical channel to be tuned to; a switching control means for instructing the tuning control means to switch between a diversity operation mode in which the primary system and the secondary system are tuned to the same physical channel and cooperate with each other to demodulate and decode the digital broadcast signal through a diversity process and an independent reception operation mode in which the primary system and the secondary system individually and independently demodulate and decode the digital broadcast signal; current position acquisition means for acquiring current position information indicating a current position; and broadcast area information storage means for storing broadcast area information including a physical channel and a broadcast area of a broadcast station of a broadcast service that may be received, and at least either one of information concerning a relay station of the broadcast station and information concerning an affiliate station of the broadcast station, wherein, based on the current position information acquired by the current position acquisition means and the broadcast area information stored in the broadcast area information storage means, the switching control means instructs the tuning control means to switch between the diversity operation mode and the independent reception operation mode.

Effects of the Invention

In the digital broadcast reception apparatus according to the present invention, the primary and secondary systems operated in the diversity operation mode or the independent reception operation mode are tuned to the physical channel instructed about by the tuning control means, receive a digital broadcast signal of a broadcast service broadcasted from a broadcast station through the tuned physical channel, and demodulate and decode the digital broadcast signal. The switching control means instructs the tuning control means to select the diversity operation mode and the independent reception operation mode based on the current position information acquired by the current position acquisition means and the broadcast area information stored in the broadcast area information storage means. This enables an operation in an appropriate operation mode in accordance with the current position.

More specifically, if the current position is close to the boundary of the broadcast area at which a reception state is often deteriorated, the tuning control means selects the diversity operation mode so that the primary and secondary systems are operated in the diversity operation mode. Therefore, the reception state can be improved, and a viewable area can be increased. If the current position is not close to the boundary of the broadcast area, that is, located in a middle region of the broadcast area where the reception state is good, the tuning control means selects the independent reception operation mode so that the primary and secondary systems are operated in the independent reception operation mode. This enables one system to continue the viewing while the other system performs the search. Therefore, in a case where the reception state is deteriorated, the switching to a physical channel having a good reception state can be smoothly performed. Thus, the digital broadcast reception apparatus can be achieved that allows a stable viewing even if a reception environment changes along with a movement.

These and other objects, features, aspects and advantages of the present invention will become more apparent from the following detailed description when taken in conjunction with the accompanying drawings.

BRIEF DESCRIPTION OF THE DRAWINGS

FIG. 2 is a diagram showing an exemplary broadcast area table stored in a broadcast area information storage section 34 according to the embodiment of the present invention.

FIG. 7 is a diagram showing an example in which information that uniquely identifies a TS is recorded in the broadcast area table stored in the broadcast area information storage section 34 according to the embodiment of the present invention.

EMBODIMENT FOR CARRYING OUT THE INVENTION

Figure 1:
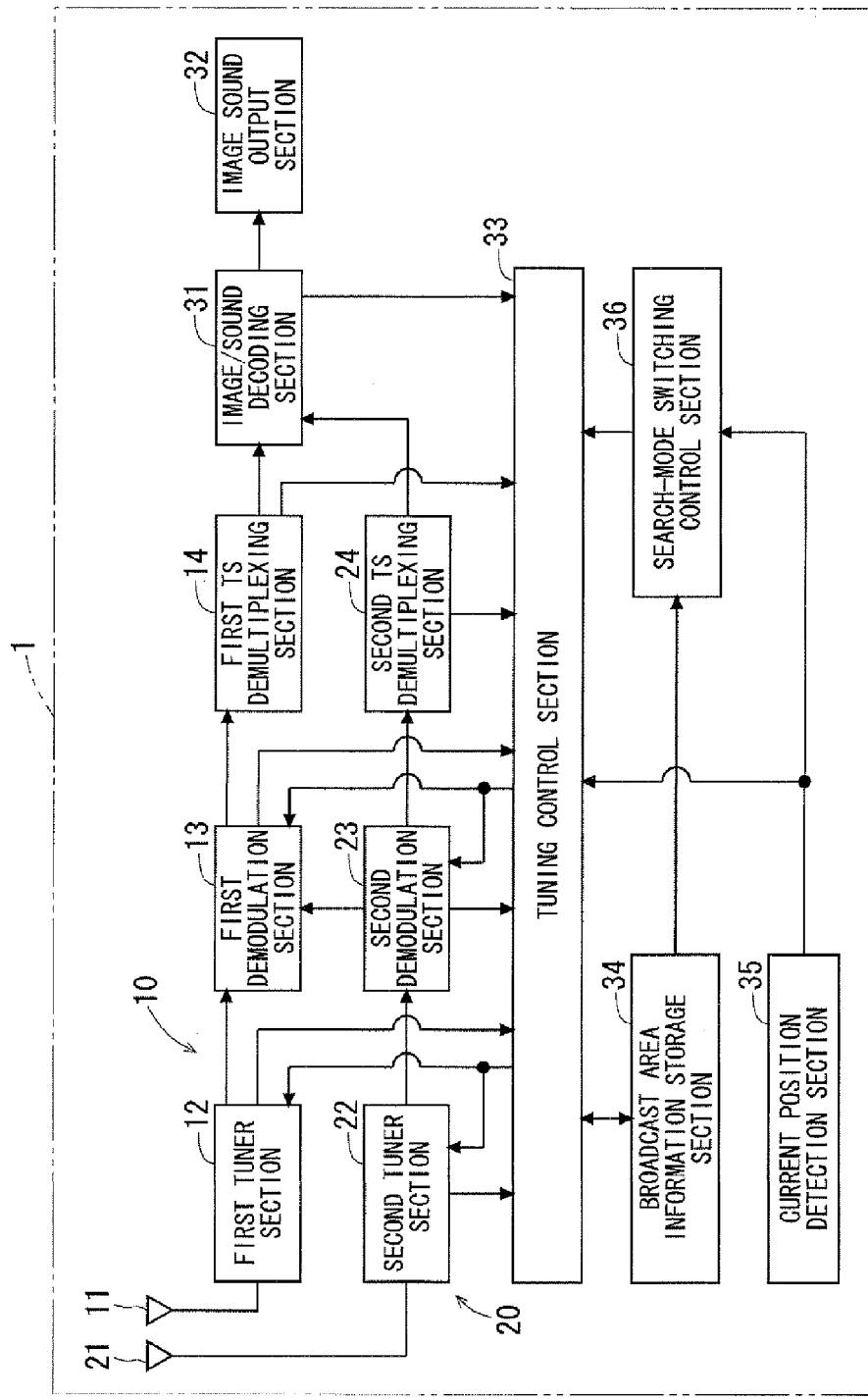
FIG. 1 is a block diagram showing a configuration of a digital broadcast reception apparatus 1 according to an embodiment of the present invention.

FIG. 1 is a block diagram showing a configuration of a digital broadcast reception apparatus 1 according to an embodiment of the present invention. The digital broadcast reception apparatus 1 includes a first antenna 11, a first tuner section 12, a first demodulation section 13, a first transport stream (abbreviated as TS) demultiplexing section 14, a second antenna 21, a second tuner section 22, a second demodulation section 23, a second TS demultiplexing section 24, an image/sound decoding section 31, an image sound output section 32, a tuning control section 33, a broadcast area information storage section 34, a current position detection section 35, and a search-mode switching control section 36.

The first antenna 11, the first tuner section 12, the first demodulation section 13, the first TS demultiplexing section 14, the image/sound decoding section 31, and the image sound output section 32 form a first system 10 that is a reception system receiving a digital broadcast signal. The second antenna 21, the second tuner section 22, the second demodulation section 23, the second TS demultiplexing section 24, the image/sound decoding section 31, and the image sound output section 32 form a second system 20 that is another reception system receiving a digital broadcast signal. In other words, the digital broadcast reception apparatus 1 includes two reception systems for receiving a digital broadcast signal, namely the first system 10 and the second system 20.

The first system 10 corresponds to a primary system, and the second system 20 corresponds to a secondary system. The tuning control section 33 corresponds to tuning control means. The broadcast area information storage section 34 corresponds to broadcast area information storage means. The current position detection section 35 corresponds to current position acquisition means. The search-mode switching control section 36 corresponds to switching control means.

The first antenna 11 is adapted to receive a digital broadcast signal of a broadcast service broadcasted from a broadcast station. The digital broadcast signal received by the first antenna 11 is given to the first tuner section 12 included in the first system 10. The first tuner section 12 receives the digital broadcast signal given from the first antenna 11, extracts a signal of a specific frequency from the received digital broadcast signal, and gives the resulting signal to the first demodulation section 13.

Which frequency of the received digital broadcast signal is to be extracted by the first tuner section 12 is controlled by a tuning control section 33 which will be described later. In other words, the first tuner section 12 extracts the signal of the specific frequency based on a predetermined control signal given from the tuning control section 33. The specific frequency is a frequency of any of a plurality of physical channels (hereinafter sometimes referred to simply as a "channel") included in the digital broadcast signal. Extracting a signal of the specific frequency means tuning to a channel and receiving, through the tuned physical channel, the digital broadcast signal of the broadcast service broadcasted from the broadcast station.

Also, the first tuner section 12 outputs, to the tuning control section 33, information of a reception level of the received signal, for example, reception C/N ratio (Carrier to Noise ratio:ratio of carrier wave power to noise power) information. The first tuner section 12 also outputs PLL (Phase Locked Loop) lock information to the tuning control section 33.

The first demodulation section 13 performs demodulation and error correction on the signal given from the first tuner section 12, and outputs a TS. The TS outputted from the first demodulation section 13 is given to the first TS demultiplexing section 14. The first demodulation section 13 also outputs, to the tuning control section 33, at least either one of frame lock information and error rate information.

The first TS demultiplexing section 14 extracts, for example, program specific information (abbreviated as PSI) and program sequence information (Service Information; abbreviated as SI), as program information that is information concerning a program, from the received digital broadcast signal and to be specific, from the TS given from the first demodulation section 13. The first TS demultiplexing section 14 stores the extracted PSI and SI in a memory not shown.

Based on the extracted PSI and/or SI (hereinafter sometimes referred to as "PSI/SI"), the first TS demultiplexing section 14 detects the value of a TS packet identifier (abbreviated as PID) of at least one type of an image TS packet and a sound TS packet included in the TS, and filters the TS through each PID, so that the image TS packet and the sound TS packet are extracted in a separate manner. Here, the format of an image included in the image TS packet may be the MPEG (Moving picture Experts Group) 2-video, the MPEG4-AVC (Advanced Video Coding), or the other formats. In addition, the format of a sound included in the sound TS packet may be the MPEG2-BC (Backward Compatible), the MPEG2-AAC (Advanced Audio Coding), the AC3 (Dolby AC3: Audio Code Number 3), or the other formats. Moreover, it may be acceptable to simultaneously extract a plurality of types of image TS packets and sound TS packets.

The first TS demultiplexing section 14 gives, to the image/sound decoding section 31, a TS packet of at least one type of the extracted image TS packet and sound TS packet. The first TS demultiplexing section 14 also outputs to the tuning control section 33 at least any one of various types of information including program association (integration) table (abbreviated as PAT) discontinuity information (break information), program correspondence table (Program Map Table; abbreviated as PMT) discontinuity information (break information), TS desynchronization (synchronization lost) information, and loss information of TS packet (packet lost information).

The PAT discontinuity information is issued in a case where the PAT does not arrive at predetermined time intervals. The PMT discontinuity information is issued in a case where the PMT does not arrive at predetermined time intervals. The TS desynchronization information (notification) is issued in a case where a sync byte is not detected in each 188 bytes in the TS. The loss information (notification) of TS packet is issued in a case where a discontinuity of a continuity counter value existing in the header of the TS is detected.

The TS sometimes includes a plurality of services. Which of the services included in the TS is the object of the tuning of the first TS demultiplexing section 14 is controlling by the tuning control section 33 which will be described later. In other words, the first TS demultiplexing section 14 tunes to the service included in the TS based on the predetermined control signal given from the tuning control section 33.

The second antenna 21, the second tuner section 22, the second demodulation section 23, and the second TS demultiplexing section 24 included in the second system 20 have the same functions and perform the same portions as those of the first antenna 11, the first tuner section 12, the first demodulation section 13, and the first TS demultiplexing section 14 included in the above-described first system 10, respectively. Therefore, descriptions of the second antenna 21, the second tuner section 22, the second demodulation section 23, and the second TS demultiplexing section 24 are omitted.

The image/sound decoding section 31 decodes a TS packet of at least one type of the image TS packet and the sound TS packet given from the first TS demultiplexing section 14 or the second TS demultiplexing section 24. The image/sound decoding section 31 outputs an image signal obtained as a result of decoding the image packet and a sound signal obtained as a result of decoding the sound packet to the image sound output section 32. Moreover, in a case where a decoding process for at least either one of the image TS packet and the sound TS packet cannot be performed, the image/sound decoding section 31 outputs at least either one of decoding-error detection information and decoding error rate information to the tuning control section 33.

The image sound output section 32 displays an image on a display screen based on the image signal outputted from the image/sound decoding section 31, and outputs a sound through a loudspeaker based on the sound signal outputted from the image/sound decoding section 31.

In this embodiment, the digital broadcast reception apparatus 1 is configured to be switchable between two operations, namely, an independent reception operation mode (hereinafter sometimes referred to as a "independent reception mode") in which the first system 10 and the second system 20 output the TSs independently of each other, and a diversity operation mode (hereinafter sometimes referred to as a "diversity mode") in which a single TS having the higher reception stability is outputted. The tuning control section 33 notifies the first demodulation section 13 and the second demodulation section 23 of an instruction of the switching.

In the independent reception mode, the first system 10 and the second system 20 independently and individually demodulate the digital broadcast signals and make an output. In this embodiment, in the independent reception mode, the first system 10 performs an image/sound decoding process for viewing, and the second system 20 searches a relay station or an affiliate station that may be broadcasting the same program through a channel different from the channel currently used for the viewing by the first system 10.

In the independent reception mode, the TS outputted from the first demodulation section 13 is outputted to the first TS demultiplexing section 14, and the TS outputted from the second demodulation section 23 is outputted to the second TS demultiplexing section 24. As described above, the first TS demultiplexing section 14 separates the TS given from the first demodulation section 13 into elementary streams of the image TS packet and the sound TS packet, and outputs them to the image/sound decoding section 31. The first TS demultiplexing section 14 also extracts PSI/SI section data. The second TS demultiplexing section 24 extracts PSI/SI section data, and detects whether or not the received TS is a relay station or an affiliate station of the currently viewed TS. In a case of detecting that it is the relay station or the affiliate station, the second TS demultiplexing section 24 notifies the tuning control section 33 thereof.

In the diversity mode, the first tuner section 12 of the first system 10 and the second tuner section 22 of the second system 20 tune to the same physical channel, and cooperate with each other to demodulate the digital broadcast signal and output a resulting signal through a diversity process.

More specifically, in the diversity mode, the second TS demultiplexing section 24 is not used, and the output of the second demodulation section 23 is inputted to the first demodulation section 13. In the first demodulation section 13, the diversity process is performed to output a single TS having a higher stability, which is given to the image/sound decoding section 31 through the first TS demultiplexing section 14. Then, the image signal and the sound signal outputted from the image/sound decoding section 31 are given to the image sound output section 32, so that an image is displayed on the display screen while a sound is outputted through the loudspeaker. In this embodiment, the diversity process is a combining diversity process in which demodulated TSs are combined and outputted as a single TS. However, this is notlimitative, and a selection diversity process in which one of the demodulated TSs having a better reception state is selected and outputted may be performed.

The tuning control section 33 gives to the first and second demodulation sections 13 and 23 an instruction indicating which of the independent reception mode and the diversity mode is to be adopted for the operation. The first and second demodulation sections 13 and 23 receive the operation-mode instruction from the tuning control section 33, and operate in either of the independent reception mode and the diversity mode.

The tuning control section 33 determines which channel the first system 10 is to be tuned to based on a tuning request from a user or a reception state determined by itself, and controls the first tuner section 12 and the first TS demultiplexing section 14 so as to tune the first system 10 to that channel. The tuning control section 33 also determines which channel the second system 20 is to be tuned to based on the tuning request from the user or the reception state determined by itself, and controls the second tuner section 22 and the second TS demultiplexing section 24 so as to tune the second system 20 to that channel.

For example, upon receiving a tuning instruction from the user through an input section not shown, the tuning control section 33 acquires a physical channel from the broadcast area information storage section 34 which will be described later, and performs the tuning by using the physical channel. To be more specific, the tuning control section 33 instructs the first and second tuner sections 12 and 22 to be tuned to a specific physical channel, based on the acquired physical channel.

Also, the tuning control section 33 determines the reception state and instructs the first and second tuner sections 12 and 22 about the tuning, based on at least any one of the reception C/N ratio information and the PLL lock information given from the first and second tuner sections 12 and 22, and the frame lock information for an orthogonal frequency division multiplexing (abbreviated as OFDM) frame and the error rate information given from the first and second demodulation sections 13 and 23. When, for example, the C/N ratio indicated by the reception C/N ratio information is less than a predetermined value, the tuning control section 33 determines that the reception state is deteriorated, and more specifically, that the reception is impossible. When, for example, it is determined that the PLL is unlocked based on the PLL lock information, the tuning control section 33 also determines that the reception is impossible. When, for example, it is determined that a frame lock of the OFDM frame is unlocked based on the frame lock information, the tuning control section 33 also determines that the reception is impossible. When, for example, it is determined that an error rate indicated by the error rate information exceeds a predetermined value, the tuning control section 33 also determines that the reception is impossible.

Also, the tuning control section 33 determines the reception state and instructs the first and second tuner sections 12 and 22 about the tuning, based on at least any one of the PAT discontinuity information, the PMT discontinuity information, the TS desynchronization information, and the TS packet loss information given from the first and second TS demultiplexing sections 14 and 24. When, for example, a discontinuity of the PAT is detected based on the PAT discontinuity information, the tuning control section 33 also determines that the reception is impossible. When, for example, a discontinuity of the PMT is detected based on the PMT discontinuity information, the tuning control section 33 also determines that the reception is impossible. When, for example, a TS desynchronization is detected based on the TS desynchronization information, the tuning control section 33 determines that the reception is impossible. When, for example, a loss of the TS packet is detected based on the TS packet loss information, the tuning control section 33 also determines that the reception is impossible.

Also, the tuning control section 33 determines the reception state and instructs the first and second tuner sections 12 and 22 about the tuning, based on at least either one of the decoding-error detection information and the decoding error rate information given from the image/sound decoding section 31. When, for example, a decoding error is detected based on the decoding-error detection information, the tuning control section 33 determines that the reception is impossible. When, for example, it is determined that a decoding error rate indicated by the decoding error rate information exceeds a predetermined value, the tuning control section 33 also determines that the reception is impossible.

FIG. 2 is a diagram showing an exemplary broadcast area table stored in the broadcast area information storage section 34 according to the embodiment of the present invention. The broadcast area information storage section 34 stores broadcast area information that includes a physical channel and a broadcast area of a broadcast station for a receivable broadcast service and at least either one of information concerning a relay station of the broadcast station and information concerning an affiliate station of the broadcast station. In this embodiment, the broadcast area information storage section 34 stores at least one of a physical channel of the relay station and a physical channel of the affiliate station, as at least one of the information concerning the relay station and the information concerning the affiliate station. More specifically, the broadcast area information storage section 34 stores, as the broadcast area information, a broadcast area table listing a broadcast service receivable at each position.

For example, as shown in FIG. 2, the broadcast area table lists a TS name 41, a physical channel 42 thereof, and a broadcast area (hereinafter sometimes referred to as a "reception area") 43 where the TS is receivable, and additionally lists a channel that may be broadcasting the same program, such as a physical channel (hereinafter sometimes referred to as an "MFN physical channel") 44 of the relay station of a multi-frequency network (abbreviated as MFN) of the physical channel 42, and a physical channel (hereinafter sometimes referred to as an "affiliate station channel") 45 of the affiliate station.

In FIG. 2, the broadcast area 43 is a rectangular area, and the latitude and longitude of each of the four corners thereof are listed. Alternatively, the broadcast area may be expressed as a circular or polygonal shape, and the latitude and longitude of such a broadcast area may be listed. In this embodiment, the broadcast area table is preliminarily stored in the broadcast area information storage section 34 before shipment of the product. This is not limitative, and the broadcast area table may be configured to, while moving, update received TS information together with the information of the latitude and longitude. Thus, the broadcast area information storage section 34 may be configured to update the broadcast area information based on the broadcast area where the broadcast service could be received.

Additionally, the broadcast area table may be generated based on a cell list (cell_list) descriptor and a cell link frequency (cell_link_frequency) descriptor included in a network information table (abbreviated as NIT) section that is transmitted in the DVB-T (Digital Video Broadcasting-Terrestrial) standard that is a terrestrial digital broadcasting standard in the DVB (Digital Video Broadcasting) standard. These descriptors describe, as the reception area information indicating the broadcast area where the broadcast service is receivable, the latitude and longitude of a broadcast area expressed as a rectangular shape, and a relay station capable of reception in the area.

Generating the broadcast area table based on these descriptors means updating the broadcast area table that is the broadcast area information along with updating of these descriptors and thus along with updating of the reception area information described by these descriptors. In this manner, the broadcast area information storage section 34 may be configured to update the broadcast area information upon updating of the digital broadcast signal of the broadcast service broadcasted by the broadcast station, and specifically upon updating of the reception area information included in the NIT section, and more specifically upon updating of the cell list (cell list) descriptor and the cell link frequency (cell link frequency) descriptor included in the NIT section.

Alternatively, the broadcast area table may be generated by using a frequency list transmitted in the ISDB-T (Integrated Services Digital Broadcasting-Terrestrial) standard that is a terrestrial digital television broadcasting standard. The frequency list lists zip codes, transmission powers and physical channels, and information of relay stations and affiliate stations of transmitting stations throughout the country. The broadcast area information may be generated by recognizing the latitude and longitude of a transmitting station based on the zip code of the transmitting station, estimating the distance of a transmission radius based on the transmission power, and setting a circular broadcast area. In this manner, the broadcast area information storage section 34 may be configured to estimate and store the broadcast area based on the zip code of the location of and a transmission output of the transmitting station listed in the frequency list that is included in the digital broadcast signal of the broadcast service broadcasted from the broadcast station.

Referring to FIG. 1 again, the current position detection section 35 detects the current position of the digital broadcast reception apparatus 1 based on, for example, a signal from a global positioning system (abbreviated as GPS) antenna. The current position is represented by, for example, the latitude and longitude of the current position. The current position detection section 34 notifies each of the tuning control section 33 and the search-mode switching control section 36 of the information (hereinafter sometimes referred to as "current position information") indicating the detected current position.

The search-mode switching control section 36 refers to the broadcast area table stored in the broadcast area information storage section 34, and, based on the current position information given from the current position detection section 34, determines whether or not the current position is close to the boundary of the broadcast area, that is, whether or not the current position is located in a near-boundary area of the broadcast area. In this manner, the search-mode switching control section 36 determines whether or not the current position indicated by the current position information is close to the boundary of the broadcast area of the broadcast station that broadcasts the currently received broadcast service, which is acquired from the broadcast area information. Here, the "near-boundary area of the broadcast area" means a region in the broadcast area close to the boundary of the broadcast area. In the following, a remaining region in the broadcast area other then the near-boundary area will be referred to as a "middle region of the broadcast area". Thus, a region surrounding the middle region serves as the near-boundary area.

The determination of whether or not the current position is close to the boundary of the broadcast area is made based on, for example, the shortest distance between the current position and the boundary line of the broadcast area. In a case where the shortest distance between the current position and the boundary line of the broadcast area is equal to or smaller than a preset threshold value, the search-mode switching control section 36 determines that the current position is close to the boundary of the broadcast area, and in a case where the shortest distance exceeds the threshold value, the search-mode switching control section 36 determines that the current position is not close to the boundary of the broadcast area. A region in which the shortest distance between the current position and the boundary line of the broadcast area exceeds the threshold value is the middle region of the broadcast area.

When it is determined that the current position is close to the boundary of the broadcast area, the search-mode switching control section 36 notifies the tuning control section 33 to switch to the diversity mode. On the other hand, when it is determined that the current position is not close to the boundary of the broadcast area, the search-mode switching control section 36 notifies the tuning control section 33 to switch to the independent reception mode. In this manner, the search-mode switching control section 36 instructs the tuning control section 33 to select the diversity operation mode when the current position is close to the boundary of the broadcast area and to select the independent reception operation mode when the current position is not close to the boundary of the broadcast area.

The tuning control section 33 receives the notification given from the search-mode switching control section 36, and instructs the first and second systems 10 and 20 and more specifically the first and second demodulation sections 13 and 23 about which of the diversity mode and the independent reception mode is to be adopted for the operation.

Based on the latitude and longitude of the current position indicated by the current position information given from the current position detection section 35, the tuning control section 33 acquires, from the broadcast area information storage section 34, channel information about channels determined to be capable of reception at the current position, and performs a preferential search for preferentially searching a relay station or an affiliate station corresponding to the currently viewed TS from the channels. After the preferential search, remaining channels are searched. Thus, in this embodiment, all channels are searched.

In the independent reception mode, according to this search order, the second tuner section 22 is instructed about the tuning, and the program is viewed in the first system 10 while simultaneously the relay station or the affiliate station corresponding to the TS currently received by the first system 10 is searched in the second system 20. In the diversity mode, at a time point when the reception state of the first system 10 currently viewing the program is deteriorated, that is, at a time point when the reception becomes no longer possible, the first tuner section 12 and the second tuner section 22 are instructed about the tuning according to the aforementioned search order.

Figure 3:
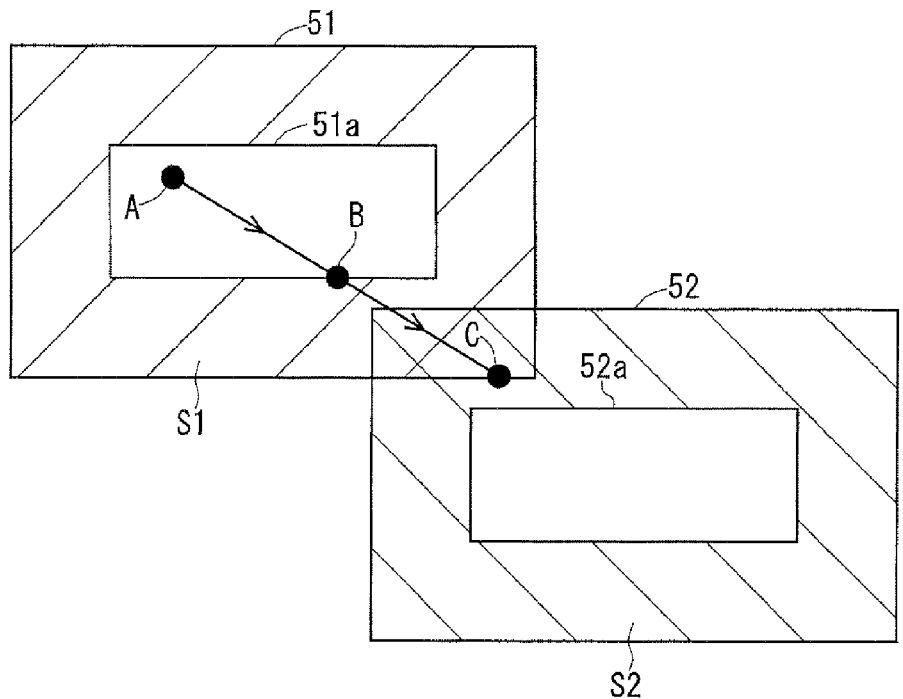
FIG. 3 is a diagram for the explanation of a search-mode switching control operation along with a movement.

FIG. 3 is a diagram for the explanation of a search-mode switching control operation along with a movement. In an example shown in FIG. 3, a description is given of an operation of the digital broadcast reception apparatus 1 in a case where a mobile object such as a vehicle having the digital broadcast reception apparatus 1 installed therein starts a point A and moves through a point B to a point C shown in FIG. 3.

In FIG. 3, the point A is located in a middle region 51*a* of a broadcast area 51 of a first broadcast service. The point B is located on a boundary line between the middle region 51*a* of the broadcast area 51 that broadcasts the first broadcast service and a near-boundary area S1 that is a region surrounding the middle region 51*a*. The point C is located on a boundary line defining the broadcast area 51 that broadcasts the first broadcast service and located in a near-boundary area S2 of a broadcast area 52 of a relay station that broadcasts the first broadcast service.

The near-boundary area S1 of the broadcast area 51 that broadcasts the first broadcast service corresponds to a region between the boundary line defining the broadcast area 51 and the boundary line defining the middle region 51a of the broadcast area 51. The near-boundary area S2 of the broadcast area 52 of the relay station is a region surrounding a middle region 52a of the broadcast area 52 of the relay station, and corresponds to a region between a boundary line defining the broadcast area 52 and a boundary line defining the middle region 52a of the broadcast area 52. As shown in FIG. 3, the broadcast area 51 that broadcasts the first broadcast service partially overlaps the broadcast area 52 of the relay station thereof.

Firstly, it is assumed that the first broadcast service is viewed at the point A. For example, during a movement from the point A to the point B, it is determined that the current position belongs not to the near-boundary area S1 of the first broadcast service but to the middle region 51a of the broadcast area 51 that broadcasts the first broadcast service. Accordingly, the search-mode switching control section 36 notifies the tuning control section 33 to switch to the independent reception operation mode.

On the other hand, during a movement from the point B to the point C, it is determined that the current position belongs to the near-boundary area S1 of the broadcast area 51 that broadcasts the first broadcast service and to the near-boundary area S2 of the broadcast area 52 of the relay station. Accordingly, the search-mode switching control section 36 notifies the tuning control section 33 to switch to the diversity mode.

Figure 4:
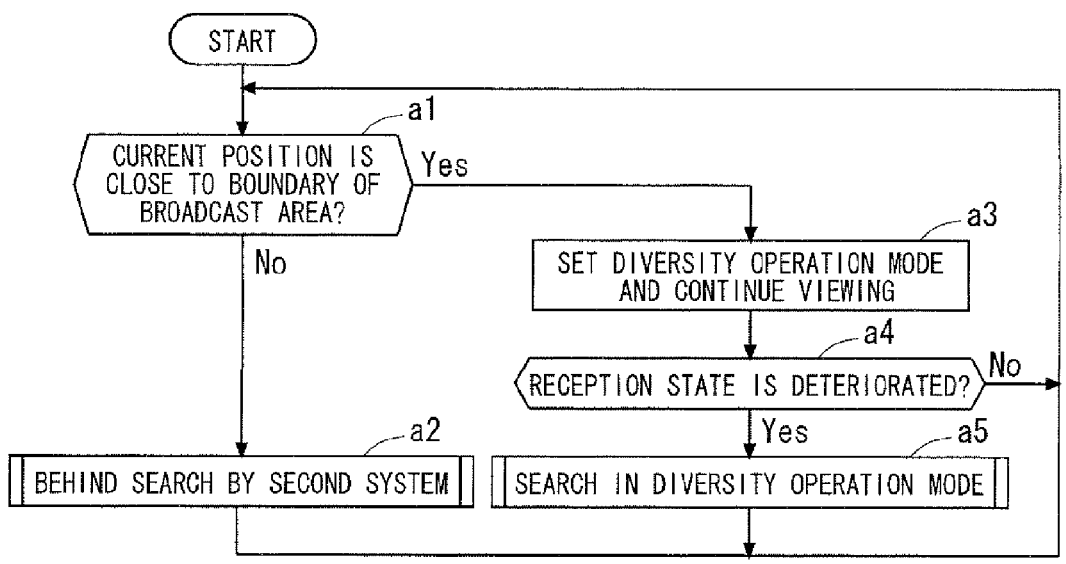
FIG. 4 is a flowchart showing process steps of the search-mode switching control operation in the digital broadcast reception apparatus 1.

FIG. 4 is a flowchart showing process steps of the search-mode switching control operation in the digital broadcast reception apparatus 1. Each of the steps in the flowchart shown in FIG. 4 is performed by the search-mode switching control section 36 and the tuning control section 33. When the digital broadcast reception apparatus 1 is supplied with power, the process of the flowchart shown in FIG. 4 is started, and moves to step a1.

In step a1, the search-mode switching control section 36 determines whether or not the current position is close to the boundary of the broadcast area, based on the current position information given from the current position detection section 35 and the broadcast area table stored in the broadcast area information storage section 34. More specifically, the search-mode switching control section 36 determines that the current position is close to the boundary of the broadcast area in a case where the shortest distance between the current position and the boundary line of the broadcast area is equal to or smaller than the preset threshold value, and determines that the current position is not close to the boundary of the broadcast area in a case where the shortest distance exceeds the threshold value. In step a1, if it is determined that the current position is close to the boundary, the process moves to step a3, and if it is determined that the current position is not close to the boundary, the process moves to step a2.

For example, while the digital broadcast reception apparatus 1 is moving from the point A to the point B shown in FIG. 3 described above, the process moves to step a2 because the determination in step a1 is that the current position belongs to the middle region 51a of the broadcast area 51 of the first broadcast service, not to the near-boundary area S1 of the first broadcast service. On the other hand, while the digital broadcast reception apparatus 1 is moving from the point B to the point C shown in FIG. 3, the process moves to step a3 because it is determined that the current position belongs to the near-boundary area S1 of the broadcast area 51 of the first broadcast service and to the near-boundary area S2 of the broadcast area 52 of the relay station.

In step a2, the tuning control section 33 instructs the second system 20 to perform the behind search. The behind search means that the second system 20 searches a relay station or an affiliate station that corresponds to the TS currently used for the viewing in the first system 10 while the first system 10 is continuously performing the image and sound decoding process, a image display process, and a sound output process. A detailed operation of the behind search will be described later. Instructing the second system 20 to perform the behind search by the tuning control section 33 means setting the independent reception operation mode. After causing the second system 20 to perform the behind search, the process returns to step a1, and the above-described processes are repeated.

In step a3, the search-mode switching control section 36 notifies the tuning control section 33 to switch to the diversity mode. This causes the tuning control section 33 to set the diversity operation mode in the first and second systems 10 and 20, and to give an instruction to continue the viewing. Then, the process moves to step a4.

In step a4, the tuning control section 33 determines whether or not the reception state of the first system 10 is deteriorated. If it is determined that the reception state is deteriorated, the process moves to step a5, and if it is determined that the reception state is not deteriorated, the process returns to step a1 so that the processes starting with the above-described determination of whether or not the current position is close to the boundary of the broadcast area are repeated. Whether or not the reception state is deteriorated is determined based on whether or not a parameter representing the reception state, such as reception strength value, is equal to or less than a preset threshold value. If the reception strength value is equal to or less than the preset threshold value, it is determined that the reception state is deteriorated, and if the reception strength value exceeds the preset threshold value, it is determined that the reception state is not deteriorated.

Also, the tuning control section 33 may determine whether or not the reception state of the first system 10 is deteriorated, based on at least any one of the reception C/N ratio information and the PLL lock information given from the first tuner section 12, the frame lock information for the OFDM frame and the error rate information given from the first demodulation section 13, the PAT discontinuity information, the PMT discontinuity information, the TS desynchronization information, and the TS packet loss information given from the first TS demultiplexing section 14, and the decoding-error detection information and the decoding error rate information given from the image/sound decoding section 31.

In step a5, a relay station or an affiliate station is searched in the diversity mode. Details of a search process in the diversity mode will be described later. After the execution of the search process in the diversity mode, the process returns to step a1 and the above-described processes are repeated.

Figure 5:
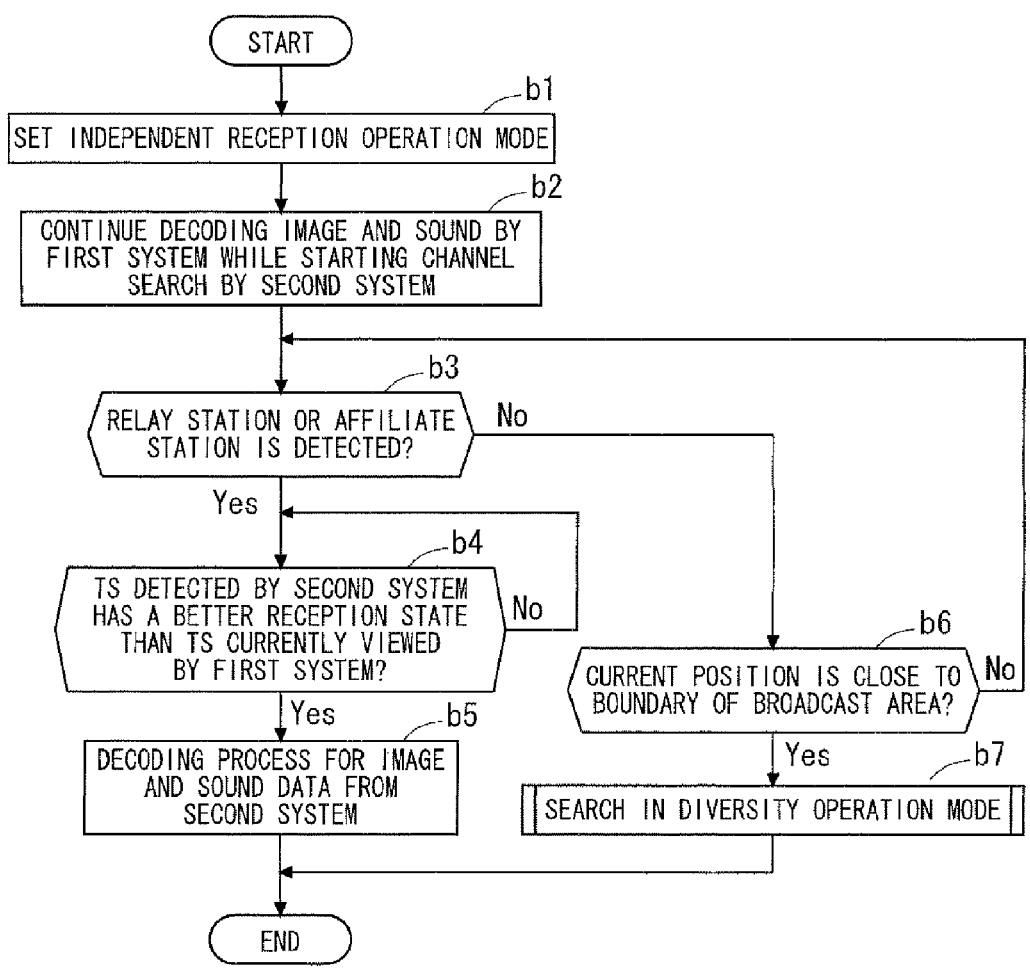
FIG. 5 is a flowchart showing process steps of a behind search operation in the digital broadcast reception apparatus 1.

FIG. 5 is a flowchart showing process steps of the behind search operation in the digital broadcast reception apparatus 1. Each of the processes in the flowchart shown in FIG. 5 is performed by the search-mode switching control section 36 and the tuning control section 33. When it is determine in step a1 shown in FIG. 4 that the current position is not close to the boundary of the broadcast area and the process moves to step a2, the process of the flowchart shown in FIG. 5 is started and moves to step b1.

In step b1, the search-mode switching control section 36 notifies the tuning control section 33 to switch to the independent reception mode. This causes the tuning control section 33 to instruct the first and second demodulation sections 13 and 23 to switch to the independent reception mode and to set the operation mode to the independent reception mode. After setting to the independent reception mode in this manner, the process moves to step b2.

Then, in step b2, the tuning control section 33 continues decoding the image signal and the sound signal by the first system 10, and starts a channel search by the second system 20. At this time, the tuning control section 33 notifies the second tuner section 22 of an instruction to be sequentially tuned to each of all physical channels. In this embodiment, the tuning control section 33 acquires, from the broadcast area information storage section 34, a physical channel of a relay station or an affiliate station having a high possibility of reception at the current position, and gives an instruction to start the tuning and the searching from that physical channel, in other words, an instruction to perform the above-described preferential search. After starting the channel search by the second system 20 while continuing decoding the image signal and the sound signal by the first system 10, the process moves to step b3.

In step b3, the tuning control section 33 determines whether or not a relay station or an affiliate station is detected. To be specific, the tuning control section 33 firstly confirms that the PLL is locked based on the PLL lock information given from the second tuner section 22, and then confirms that an OFDM frame lock can be established in the second demodulation section 23 based on the frame lock information given from the second demodulation section 23.

If the PLL lock and the OFDM lock are confirmed, then the tuning control section 33 waits for the second TS demultiplexing section 24 to acquire the NIT section or the broadcaster information table (abbreviated as BIT) section. If they are acquired, the tuning control section 33 determines whether or not it is a relay station or an affiliate station corresponding to the TS of the physical channel currently used for the viewing in the first system 10, based on the PSI/SI information. In this determination, for example, if based on information described in the NIT, a TS_ID described in the NIT is identical to the TS_ID of the TS of the physical channel currently used for the viewing in the first system 10, it is determined that a relay station is detected. Also, if, based on information described in the BIT, the affiliated company identification value (affiliation_id value) identical to that of the TS of the physical channel currently used for the viewing in the first system 10 is stored in the BIT, it is determined that an affiliate station is detected. If the PSI/SI information used for the determination cannot be acquired, it is determined that neither of a relay station and an affiliate station is detected.

In this manner, the tuning control section 33 determines whether or not a relay station or an affiliate station is detected. If it is determined that a relay station or an affiliate station is detected, the process moves to step b4, while if it is determined that neither of a relay station and an affiliate station is detected, the process moves to step b6. Examples of the case where it is determined that neither of a relay station and an affiliate station is detected include a case where the PLL lock cannot be established, a case where the OFDM frame lock cannot be established, a case where the SI/PSI information cannot be acquired, and a case where it is determined that it is not a relay station or an affiliate station based on the SI/PSI information.

In step b4, the tuning control section 33 compares the reception state of the TS of the physical channel detected by the second system 20 with the reception state of the TS of the physical channel currently used for the viewing by the first system 10, and determines whether or not the TS of the physical channel detected by the second system 20 has a better reception state than the TS of the physical channel currently used for the viewing by the first system 10. The comparison between them is continued until the TS of the physical channel detected by the second system 20 has a better reception state. If it is determined that the TS of the physical channel detected by the second system 20 has a better reception state, the process moves to step b5.

In step b5, for the viewing of the TS of the physical channel detected by the second system 20, the tuning control section 33 causes the image data and the sound data acquired by the second system 20 to be inputted to the image/sound decoding section 31.

At this time, in the image/sound decoding section 31, the decoding process for decoding the image data and the sound data acquired by the first system 10 is temporarily stopped and the inputted is switched, and the image data and the sound data acquired by the second system 20 are outputted from the second TS demultiplexing section 24 and inputted to the image/sound decoding section 31, to start a decoding process. Alternatively, instead of this embodiment, it may be also acceptable that after the decoding process for decoding the data acquired in the first system 10 is stopped, the first system 10 is again tuned to the physical channel detected by the second system 20 so that the data is outputted from the first TS demultiplexing section 14 and inputted to the image/sound decoding section 31, to start the decoding process. After the decoding process for decoding the image data and the sound data of the TS of the physical channel detected by the second system 20, all the process steps are completed, and the process returns to step a1 shown in FIG. 4. Then, the above-described processes are repeated.

In step b6, the tuning control section 33 determines whether or not the current position is close to the boundary of the broadcast area, based on the current position information obtained from the current position detection section 35 and the broadcast area table obtained from the broadcast area information storage section 34. In step b6, if it is determined that the current position is close to the boundary of the broadcast area, the process moves to step b7, and if it is determined that the current position is not close to the boundary of the broadcast area, the process moves to step b3 and the above-described processes are repeated.

In step b7, the search-mode switching control section 36 notifies the tuning control section 33 to switch to the diversity mode, and the tuning control section 33 instructs the first and second systems 10 and 20 to search a relay station or an affiliate station in the diversity mode. Details of the search process in the diversity mode will be described later. In step b7, after the search in the diversity mode, all the process steps are completed, and the process returns to step a1 shown in FIG. 4. Then, the above-described processes are repeated.

Referring to FIG. 3 described above, during the movement from the point A to the point B, it is determined in step b6 that the current position is not close to the boundary of the broadcast area. Therefore, the tuning control section 33 returns to step b3, and continues the search by being tuned to the next physical channel in the independent reception mode. In FIG. 3, during the movement from the point B to the point C, it is determined in step b6 that the current position is close to the boundary of the broadcast area. Therefore, the tuning control section 33 moves to step b7 and performs the search in the diversity mode.

Figure 6:
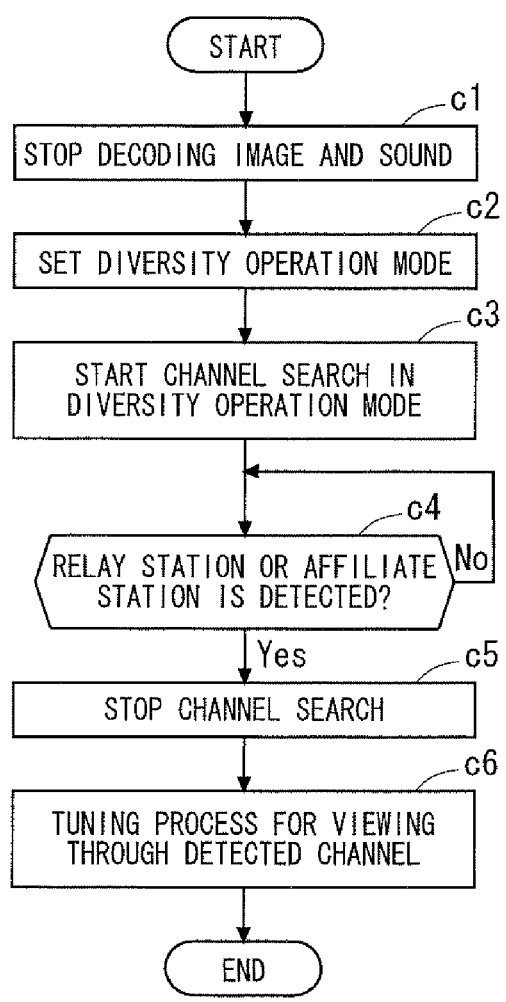
FIG. 6 is a flowchart showing process steps of a search process in a diversity mode in the digital broadcast reception apparatus 1.

FIG. 6 is a flowchart showing process steps of the search process in the diversity mode in the digital broadcast reception apparatus 1. Each of the processes in the flowchart shown in FIG. 6 is performed by the search-mode switching control section 36 and the tuning control section 33. When it is determined in step a4 shown in FIG. 4 that the reception state is deteriorated and the process moves to step a5, or when it is determined in step b6 shown in FIG. 5 that the current position is close to the boundary of the broadcast area and the process moves to step b7, the process of the flowchart shown in FIG. 6 is started and moves to step c1.

In step c1, the tuning control section 33 stops the decoding of the image data and the sound data that have been viewed, and moves to step c2. Then, in step c2, the tuning control section 33 instructs the first and second demodulation sections 13 and 23 to switch the operation mode from the independent reception mode to the diversity mode, thus setting the operation mode to the diversity mode. After thus setting of the diversity mode, the process moves to step c3.

Then, in step c3, the tuning control section 33 starts the channel search for a relay station or an affiliate station in the diversity mode. At this time, the tuning control section 33 notifies the first and second tuner sections 12 and 22 of an instruction to be sequentially tuned to each of all physical channels. In this embodiment, the tuning control section 33 acquires, from the broadcast area information storage section 34, a physical channel of a relay station or an affiliate station having a high possibility of reception at the current position, and gives an instruction to start the tuning and the searching from that physical channel, in other words, an instruction to perform the above-described preferential search. After thus starting the channel search in the diversity mode, the process moves to step c4.

In step c4, in the same manner as step b3 shown in FIG. 5 described above, the tuning control section 33 determines whether or not a relay station or an affiliate station is detected. More specifically, the tuning control section 33 firstly confirms that the PLL lock is established based on the PLL lock information given from the first and second tuner sections 12 and 22, and then confirms that an OFDM frame lock can be established in the first and second demodulation sections 13 and 23 based on the frame lock information given from the first and second demodulation sections 13 and 23.

If the PLL lock and the OFDM lock are confirmed, then the tuning control section 33 waits for the first TS demultiplexing section 14 to acquire the NIT section or the BIT section. If they are acquired, the tuning control section 33 determines whether or not it is a relay station or an affiliate station corresponding to the TS of the physical channel used for the viewing by the first system 10, based on the PSI/SI information.

In this determination, for example, similarly to step b3 of FIG. 5 described above, if, based on information described in the NIT, a TS_ID described in the NIT is identical to the TS_ID of the TS of the physical channel used for the viewing in the first system 10, it is determined that it is a relay station. Also, if, based on information described in the BIT, the affiliation_id value identical to that of the TS of the physical channel used for the viewing in the first system 10 is stored in the BIT, it is determined that it is an affiliate station. If the PSI/SI information used for the determination cannot be acquired, it is determined that neither of a relay station and an affiliate station is detected. As described above, in the diversity mode, the second TS demultiplexing section 24 of the second system 20 is not used, and the output of the second demodulation section 23 is inputted to the first demodulation section 13. Therefore, whether or not first TS demultiplexing section 14 can acquire the NIT section and the BIT section is determined.

In this manner, the tuning control section 33 determines whether or not a relay station or an affiliate station is detected. If it is determined that a relay station or an affiliate station is detected, the process moves to step c5. In step c5, the tuning control section 33 stops the channel search, and moves to step c6. In step c6, the tuning control section 33 performs a tuning process for viewing the detected relay station or affiliate station.

At this time, the diversity mode is maintained, and the image data and the sound data are decoded in a high reception stability state. After thus performing the tuning process for viewing the detected channel, all the process steps are completed, and the process moves to step a1 shown in FIG. 4. Then, the above-described processes are repeated. As a result, whether or not the current position is close to the boundary of the broadcast area is periodically monitored in step a1 shown in FIG. 4. In a case where the current position of the digital broadcast reception apparatus 1 is moved from a position close to the boundary of the broadcast area to the middle region along with a movement of the mobile object, the process moves from step a1 to step a2 where switching to the independent reception mode is made so that the second system 20 performs the behind search.

In step c4 shown in FIG. 6, if it is determined that neither of a relay station and an affiliate station is detected as a result of the search for each physical channel, the tuning control section 33 continues the search by being tuned to the next physical channel until a relay station or an affiliate station is detected. Examples of the case where it is determined that neither of a relay station and an affiliate station is detected include a case where the PLL lock cannot be established, a case where the OFDM frame lock cannot be established, a case where the SI/PSI information cannot be acquired, and a case where it is determined that it is not a relay station or an affiliate station based on the SI/PSI information.

There is a possibility that the reception state of the physical channel originally used for the viewing is improved while the search is continued in step c4. Therefore, when the search is made in step c4, the physical channel originally used for the viewing may be searched each time the search for a predetermined number of physical channels is completed.

Moreover, instead of this embodiment, if may be acceptable that if it is determined that the current position is close to the boundary of the broadcast area in the determination in step a1 shown in FIG. 4 described above of whether or not the current position is close to the boundary of the broadcast area, whether or not the current position is located in an area overlapping the broadcast area of the relay station or the affiliate station may be further determined. If it is determined that the current position is close to the boundary of the broadcast area and additionally located in the overlapping area, the process may move to step a2 to perform the behind search in the second system 20. The determination of whether or not the current position is located in the area overlapping the broadcast area of the relay station or the affiliate station is made based on, for example, the current position information given from the current position detection section 35 and the broadcast area table given from the broadcast area information storage section 34.

As described above, in the digital broadcast reception apparatus 1 according to this embodiment, the first and second systems 10 and 20 operated in the diversity operation mode or the independent reception operation mode are tuned to a physical channel instructed about by the tuning control section 33, and the digital broadcast signal of the broadcast service broadcasted from the broadcast station through the tuned physical channel is received, and demodulated and outputted. The image signal and the sound signal included in the outputted digital broadcast signal are extracted by the image/sound decoding section 31, and outputted by the image sound output section 32.

The selection of the diversity operation mode and the independent reception operation mode is made by the tuning control section 33 under the instruction from the search-mode switching control section 36, based on the current position information acquired by the current position detection section 35 and the broadcast area information stored in the broadcast area information storage section 34. This enables an operation in an appropriate operation mode in accordance with the current position.

More specifically, if the current position indicated by the current position information acquired by the current position detection section 35 is close to the boundary of the broadcast area where the reception state is frequently deteriorated, that is, if the current position is located in the near-boundary area, the tuning control section 33 selects the diversity operation mode so that the first and second systems 10 and 20 are operated in the diversity operation mode. As a result, the reception state can be improved, and a viewable area can be increased.

On the other hand, if the current position is not close to the boundary of the broadcast area, that is, if the current position is located in the middle region of the broadcast area where the reception state is good, the tuning control section 33 selects the independent reception operation mode so that the first and second systems 10 and 20 are operated in the independent reception operation mode. This enables one system to continue the viewing while the other system performs the search. Therefore, in a case where the reception state is deteriorated, the switching to a physical channel having a good reception state can be smoothly performed. Thus, the digital broadcast reception apparatus 1 can be achieved that allows a stable viewing even if a reception environment changes along with a movement of the mobile object.

To be specific, in this embodiment, the digital broadcast reception apparatus 1 performs the viewing in the diversity mode in a case where the current position is located in the near-boundary area of the broadcast area of the currently received broadcast service, and performs the viewing and the search for a relay station and an affiliate station in the independent reception mode in a case where the current position is located in a region other than the near-boundary area, that is, in the middle region.

In the middle region of the broadcast area, the reception temporarily becomes impossible at a high rate because of ground structures such as buildings, and a quick search is demanded. However, since only a single TS can be used in the diversity mode, the search is performed after the decoding is stopped. Therefore, performing the operation the diversity mode in the middle region of the broadcast area may increase a time period in which the viewing is impossible.

On the other hand, in a case of performing the operation in the independent reception mode in the middle region of the broadcast area as described in this embodiment, the viewing of the physical channel originally used for the viewing is maintained by the first system 10 while the search is performed by the second system 20 that is another system. This allows an early recovery in a case where the reception state is temporarily deteriorated due to the movement behind a building for example and then improved. That is, a time period required for returning to the viewable state can be shortened.

Additionally, the second system 20 that is another system performs the search in advance before the reception becomes impossible. Therefore, if a relay station or an affiliate station has been searched, a seamless switching to the relay station or the affiliate station can be made in a case where the reception temporarily becomes impossible.

Moreover, in the middle region of the broadcast area, the reception state is not poor, and there is a low possibility of occurrence of a trouble in the viewing even without operating in the diversity mode having a higher stability. Thus, performing the operation in the independent reception mode in the middle region of the broadcast area as in this embodiment allows a continuous viewing of the same program as much as possible.

Furthermore, this embodiment provides the viewing in the diversity mode if the current position is located in the near-boundary area of the broadcast area. This is based on the consideration that the reception state is often deteriorated in the near-boundary area of the broadcast area and therefore the reception becomes impossible as the current position is farther from the broadcast area. In such a near-boundary area, performing the operation in the diversity mode can improve the reception state and the viewable area can be increased.

Even though another system performs the search in the independent reception mode in such an area, the viewable area is reduced because the viewing is provided in the independent reception mode having a poorer reception stability than the diversity mode. Thus, the overlapping area overlapping the area where the relay station or the affiliate station can provide the viewing is reduced. This increases the frequency of making the viewing impossible before the relay station or the affiliate station is detected in another channel.

Thus, performing the operation in the diversity mode in the near-boundary area of the broadcast area as described in this embodiment can increase the broadcast area, which consequently increase the possibility of overlap with a service area, i.e., the broadcast area, of the relay station or the affiliate station.

Then, in a case where the viewing becomes impossible during the viewing in the diversity mode, a relay station and an affiliate station are searched in the diversity mode, which can increase the broadcast area to be searched. Therefore, the overlapping area where the relay station or the affiliate station can provide the viewing can be furthermore increased, thus enabling a continuous viewing of the same program as much as possible.

In addition, for example, in order to record information about an area where the reception is temporarily impossible due to an influence of being behind a building, it is necessary to divide an area on a map into a mesh shape with a fine resolution. The reception state is recorded on a fine-mesh basis, which results in an enormous amount of data.

On the other hand, in the digital broadcast reception apparatus 1 according to this embodiment, the search mode is switched between the diversity mode and the independent reception mode depending on whether or not the current position is located in the near-boundary area of the broadcast area. Therefore, even behind a building, if the current position is not in the near-boundary area of the broadcast area, it suffices that the behind search for a relay station or an affiliate station is performed or alternatively that switching is made to a relay station or an affiliate station that has been already detected. As a result, even though the broadcast area information stored in the broadcast area information storage section 34 does not have a table meshed with a fine resolution with respect to the latitude and longitude, a relay station or an affiliate station can be effectively detected in a short time, to allow a reduction of the memory capacity.

Moreover, in this embodiment, as shown in FIG. 5 described above, while the second system 20 is performing the behind search, whether or not the current position is located in the near-boundary area of the broadcast area is monitored in step b6. If it is determined that the current position is located in the near-boundary area of the broadcast area, the switching to the diversity mode is made and the search is performed. Therefore, in a case where the current position moves to the near-boundary area of the broadcast area during the search, the search mode can be switched to a preferred one as compared with continuing the search in the independent reception mode. Thus, the performance of detection of the relay station or the affiliate station can be improved.

Here, in this embodiment, if the result of the determination of whether or not the current position is located in the near-boundary area of the broadcast area is that the current position is located in the near-boundary area of the broadcast area, the second system 20 performs the behind search in step a2 shown in FIG. 4. However, this is not limitative.

For example, in another possible configuration, if it is determined that the current position is located in the near-boundary area of the broadcast area, the broadcast area information storage section 34 may be further referred to, and if it is determined, based on the broadcast area information, that the current position is located in the near-boundary area of the broadcast area and also in the overlapping area overlapping the broadcast area of the relay station or the affiliate station, the second system 20 performs the behind search of step a2. This enables a relay station or an affiliate station to be detected in a short time if there is the possibility of occurrence of reception from the relay station or the affiliate station in the near-boundary area of the broadcast area. In this case, the broadcast area information storage section 34 stores, as the broadcast area information, not only the physical channels of the relay station and the affiliate station shown in FIG. 2 described above, but also broadcast areas of the relay station and the affiliate station.

Moreover, in this embodiment, in the diversity mode, the physical channels are sequentially searched, but this is not limitative. It may be acceptable that the physical channel originally used for the viewing is searched each time the search for a predetermined number of physical channels is completed during the search in the diversity mode. In this case, it is not necessary to wait for the completion of the search before returning the tuning to the original TS. Accordingly, if the reception state of the physical channel originally used for the viewing is improved, the viewing can be resumed in a relatively short time.

Furthermore, in this embodiment, regarding the search order in searching relay stations and affiliate stations, the tuning control section 33 performs the above-described preferential search in which physical channels of a relay station and an affiliate station having a high possibility of reception at the current position are acquired from the broadcast area information storage section 34 and then those physical channels are firstly searched. This enables a relay station or an affiliate station to be detected in a short time, and therefore if the reception becomes impossible, the switching can be made at a high speed, thus enabling a continuous viewing of the same program as much as possible.

Here, in this embodiment, the broadcast area information shown in FIG. 2 is preliminarily input at the time of shipment of the product. In addition to this, the followings are also acceptable. The broadcast area information can be generated using the frequency list transmitted in the ISDB-T. By using the cell list (cell_list) descriptor and the cell link frequency (cell_link_frequency) descriptor included in the NIT section that is transmitted in the DVB-T, the broadcast area information can be updated along with updating of reception area information described by these descriptors. The TS information received while the movement can be updated together with the information of the latitude and longitude, that is, based on the broadcast area where the broadcast service could be received. Thereby, the determination of whether or not the current position is located in the near-boundary area of the broadcast area and the recognition of a relay station or an affiliate station to be preferentially searched can be based on the most recent broadcast area information. This enables a more reliable and efficient search.

In addition, in this embodiment, in searching a relay station and an affiliate station, the above-described preferential search for preferentially searching a channel having a high possibility of reception at the current position is performed, and then all the remaining channels are searched. Here, in searching all the remaining channels, a specific channel may be preferentially searched. In this case, if it is determined that a relay station or an affiliate station is not detected in the above-described preferential search, a relay station or an affiliate station corresponding to the currently viewed TS is acquired from all the TSs stored in the broadcast area information storage section 34. Then, a distance from the center of gravity of a broadcast area thereof or from the closest point on the boundary line of the broadcast area is measured. That is, a distance between the current position and the position of the center of gravity of the broadcast area, or a distance between the current position and the boundary of the broadcast area is measured. Tuning and searching are performed preferentially from a channel of, among relay stations and affiliate stations in which the distance does not exceed a certain threshold value, a relay station or an affiliate station in which the distance is short. This enables preferential tuning to a broadcast station that is capable of a viewing in a good state depending on conditions near the boundary of the broadcast area.

Moreover, in a case where the broadcast area is stored in a rectangular shape, a circular shape, or the like, as described above, the stored broadcast area may be smaller than an actual broadcast area. Such a broadcast station whose stored broadcast area is smaller than the actual broadcast area in this manner can also be preferentially tuned during the search.

Here, the digital broadcast reception apparatus 1 according to this embodiment is effective for a movement within the same network having the same network_id listed in the NIT in which a TS and a physical channel are in one-to-one correspondence. On the other hand, in a case of a movement across different networks, such as a movement across regions in Europe for example, different TSs are often broadcasted in identical physical channels. In such a case of the movement across regions, if the search is performed by using the reception area table shown in FIG. 2, the same TS cannot be detected and turning to different TSs is attempted. Thus, it may take time to be tuned to a relay station and an affiliate station.

FIG. 7 is a diagram showing an example in which information that uniquely identifies a TS is recorded in the broadcast area table stored in the broadcast area information storage section 34 according to the embodiment of the present invention. In a case of the movement across different networks mentioned above, it is preferable to associate a certain broadcast station with its relay station and its affiliate station by using information that identifies a TS transmitted therefrom, and more specifically information that uniquely identifies the TS, as shown in the reception area table shown in FIG. 7. Thus, it is preferable that the broadcast area information storage section 34 stores at least one of the information that identifies the TS transmitted from the relay station and the information that identifies the TS transmitted from the affiliate station as at least one of the information concerning the relay station and the information concerning the affiliate station. In other words, it is preferable that the broadcast area information storage section 34 stores the relay station and the affiliate station on a TS basis.

Examples of the information (hereinafter sometimes referred to as "TS information") that identifies the TS include a combination of a network_id, an original_network_id, and a TS_ID that are listed in the NIT. For example, the reception area table shown in FIG. 7 lists: a TS name 61 that is the name of a receivable TS, a physical channel 62 that broadcasts a corresponding TS listed in the column of the TS name 61, a broadcast area 63 that is a reception area in which the TS is receivable, and TS information of a relay station and an affiliate station corresponding to the TS, that is, a relay station and an affiliate station that transmit the same TS. In FIG. 7, as the TS information of the relay station, the information that identifies the TS transmitted by a relay station of the MFN is listed in the column of a MFN TS 64. On the other hand, the TS information of the affiliate station is listed in the column of an affiliate station TS 65.

In FIG. 7, in each of the columns of the TS name 61, the MFN TS 64, and the affiliate station TS 65, a character string "TSXX" having a combination of a character string "TS" and a number is listed. In the "TSXX", the part "XX" represents the number. To be specific, the "TSXX" listed in each of the columns of the TS name 61, the MFN TS 64, and the affiliate station TS 65 stores TS information including a combination of the network_id, the original_network_id, and the TS_ID described above.

If the currently viewed program falls into an unreceivable state, the reception area table shown in FIG. 7 is referred to for TSs of the relay station and the affiliate station receivable at the current position, and TS information of the currently viewed TS is searched from the TS information of the TSs listed in the column of the TS name 61. If the TS information of the currently viewed TS is detected, the MFN TS 64 and the affiliate station TS 65 shown in FIG. 7 are referred to, and TS information of the TS that may be broadcasting the same program is acquired. The TS of this acquired TS information is preferentially searched, and thereby the tuning can be switched to a relay station or an affiliate station in a short time even though a movement is made to a different network.

In this manner, the relay station and the affiliate station are stored on a TS basis, and thereby the relay station or the affiliate station can be preferentially tuned to even though a movement is made across networks. As a result, the relay station or the affiliate station can be tuned to in a short time.

While the invention has been described in detail, the foregoing description is in all aspects illustrative and the present invention is not limited thereto. It will be appreciated that numerous modifications not illustrated herein can be made without departing from the scope of the present invention.

DESCRIPTION OF THE REFERENCE NUMERALS

11 first antenna; 12 first tuner section; 13 first demodulation section; 14 first TS demultiplexing section; 21 second antenna; 22 second tuner section; 23 second demodulation section; 24 second TS demultiplexing section; 31 image/sound decoding section; 32 image sound output section; 33 tuning control section; 34 broadcast area information storage section; 35 current position detection section; 36 search-mode switching control section.

The invention claimed is:

1. A digital broadcast reception apparatus comprising:
primary and secondary systems being tuned to a physical channel, receiving a digital broadcast signal of a broadcast service broadcasted from a broadcast station through the tuned physical channel, and demodulating and decoding the received digital broadcast signal;
a tuning controller for instructing said primary and secondary systems about a physical channel to be tuned to;
a switching controller for instructing said tuning controller to switch between a diversity operation mode in which the said primary system and said secondary system are tuned to the same physical channel and cooperate with each other to demodulate and decode the digital broadcast signal through a diversity process and an independent reception operation mode in which said primary system and said secondary system individually and independently demodulate and decode the digital broadcast signal;
a current position detector for detecting a current position; and
broadcast area information storage device in which is stored broadcast area information including a physical channel and a broadcast area of a broadcast station of a broadcast service that may be received, and at least either one of information concerning a relay station of said broadcast station and information concerning an affiliate station of said broadcast station,
wherein, based on the current position detected by said current position detector and the broadcast area information stored in said broadcast area information storage device, said switching controller instructs said tuning controller to switch between said diversity operation mode and said independent reception operation mode, and
wherein based on the current position detected by said current position detector and the broadcast area information stored in said broadcast area information storage device, said switching controller instructs said tuning controller to select said diversity operation mode if the detected current position is close to a boundary of a broadcast area that is acquired from said broadcast area information as a broadcast area of a broadcast station broadcasting the currently received broadcast service, and to select said independent reception operation mode if the detected current position is not close to the boundary of said broadcast area, wherein
said tuning controller instructs said primary and secondary systems to, if a reception state of a currently received broadcast service is deteriorated in a case where said primary and secondary systems are operating in the diversity operation mode, cooperate with each other to search a relay station and an affiliate station of the broadcast station broadcasting the currently received broadcast service, and in a case where said primary and secondary systems are operating in the independent reception operation mode, one system of said primary and secondary systems demodulates and decodes the digital broadcast signal of the currently received broadcast service while the other system searches a relay station and an affiliate station of the broadcast station broadcasting the currently received broadcast service.

2. The digital broadcast reception apparatus according to claim 1, wherein
said switching controller instructs said tuning controller to, if the detected current position is located in a near-boundary area of the broadcast area of the broadcast station broadcasting the currently received broadcast service which is acquired from said broadcast area information and also in an area overlapping a broadcast area of a relay station or an affiliate station of said broadcast station, perform said independent reception operation mode in which one system of said primary and secondary systems demodulates and decodes the digital broadcast signal of the currently received broadcast service while the other system searches the relay station and the affiliate station of the broadcast station broadcasting the currently received broadcast service, and if said relay station or affiliate station cannot be detected in said search, switch to said diversity operation mode and search said relay station and affiliate station.

3. The digital broadcast reception apparatus according to claim 1, wherein
said broadcast area information stored in said broadcast area information storage device is estimated based on a zip code of the location of and a transmission power of a transmitting station listed in a frequency list that is included in a digital broadcast signal of a broadcast service broadcasted from said broadcast station.

4. The digital broadcast reception apparatus according to claim 1, wherein
said broadcast area information stored in said broadcast area information storage device is updated upon updating of a cell list descriptor and a cell link frequency descriptor included in a network information table section included in a digital broadcast signal of a broadcast service broadcasted from said broadcast station.

5. The digital broadcast reception apparatus according to claim 1, wherein
said broadcast area information storage device stores at least either one of information that identifies a transport stream transmitted from said relay station and information that identifies a transport stream transmitted from said affiliate station, as at least either one of the information concerning the relay station of said broadcast station and the information concerning the affiliate station of said broadcast station.

6. A digital broadcast reception apparatus comprising:
primary and secondary systems being tuned to a physical channel, receiving a digital broadcast signal of a broadcast service broadcasted from a broadcast station through the tuned physical channel, and demodulating and decoding the received digital broadcast signal;
a tuning controller for instructing said primary and secondary systems about a physical channel to be tuned to;
a switching controller for instructing said tuning controller to switch between a diversity operation mode in which the said primary system and said secondary system are tuned to the same physical channel and cooperate with each other to demodulate and decode the digital broadcast signal through a diversity process and an independent reception operation mode in which said primary system and said secondary system individually and independently demodulate and decode the digital broadcast signal;
a current position detector for detecting a current position; and
broadcast area information storage device in which is stored broadcast area information including a physical channel and a broadcast area of a broadcast station of a broadcast service that may be received, and at least either one of information concerning a relay station of said broadcast station and information concerning an affiliate station of said broadcast station, wherein, based on the current position detected by said current position detector and the broadcast area information stored in said broadcast area information storage device, said switching controller instructs said tuning controller to switch between said diversity operation mode and said independent reception operation mode, and wherein based on the current position detected by said current position detector and the broadcast area information stored in said broadcast area information storage device, said switching controller instructs said tuning controller to select said diversity operation mode if the detected current position is close to a boundary of a broadcast area that is acquired from said broadcast area information as a broadcast area of a broadcast station broadcasting the currently received broadcast service, and to select said independent reception operation mode if the detected current position is not close to the boundary of said broadcast area, wherein
said tuning controller instructs said primary and secondary systems to, when searching the relay station and the affiliate station of the broadcast station broadcasting the currently received broadcast service, perform tuning preferentially from a channel having a higher possibility of reception at the current position indicated by said current position information based on said broadcast area information stored in said broadcast area information storage device, and if it is determined that said relay station or affiliate station cannot be detected in said tuning, perform tuning preferentially from a channel of a relay station or an affiliate station in which a distance is shorter, said distance being a distance between said current position and the position of the center of gravity of said broadcast area thereof which is acquired from said broadcast area information, or a distance between said current position and a boundary of said broadcast area which is acquired from said broadcast area information.

7. The digital broadcast reception apparatus according to claim 6, wherein
said switching controller instructs said tuning controller to, if the detected current position is located in a near-boundary area of the broadcast area of the broadcast station broadcasting the currently received broadcast service which is acquired from said broadcast area information and also in an area overlapping a broadcast area of a relay station or an affiliate station of said broadcast station, perform said independent reception operation mode in which one system of said primary and secondary systems demodulates and decodes the digital broadcast signal of the currently received broadcast service while the other system searches the relay station and the affiliate station of the broadcast station broadcasting the currently received broadcast service, and if said relay station or affiliate station cannot be detected in said search, switch to said diversity operation mode and search said relay station and affiliate station.

8. The digital broadcast reception apparatus according to claim 6, wherein
said broadcast area information stored in said broadcast area information storage device is estimated based on a zip code of the location of and a transmission power of a transmitting station listed in a frequency list that is included in a digital broadcast signal of a broadcast service broadcasted from said broadcast station.

9. The digital broadcast reception apparatus according to claim 6, wherein said broadcast area information stored in said broadcast area information storage device is updated upon updating of a cell list descriptor and a cell link frequency descriptor included in a network information table section included in a digital broadcast signal of a broadcast service broadcasted from said broadcast station.

10. The digital broadcast reception apparatus according to claim 6, wherein
said broadcast area information storage device stores at least either one of information that identifies a transport stream transmitted from said relay station and information that identifies a transport stream transmitted from said affiliate station, as at least either one of the information concerning the relay station of said broadcast station and the information concerning the affiliate station of said broadcast station.

* * * * *